(12) United States Patent
Özer et al.

(10) Patent No.: US 7,805,595 B2
(45) Date of Patent: Sep. 28, 2010

(54) DATA PROCESSING APPARATUS AND METHOD FOR UPDATING PREDICTION DATA BASED ON AN OPERATION'S PRIORITY LEVEL

(75) Inventors: Emre Özer, Cambridge (GB); Alastair David Reid, Fulbourn (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 301 days.

(21) Appl. No.: 11/785,918

(22) Filed: Apr. 20, 2007

(65) Prior Publication Data
US 2008/0263341 A1    Oct. 23, 2008

(51) Int. Cl.
*G06F 9/00* (2006.01)
(52) U.S. Cl. .................... 712/240; 712/239
(58) Field of Classification Search .......... 712/239, 712/240
See application file for complete search history.

(56) References Cited

U.S. PATENT DOCUMENTS

| | | | | |
|---|---|---|---|---|
| 5,426,764 | A * | 6/1995 | Ryan | 711/204 |
| 7,096,343 | B1 * | 8/2006 | Berenbaum et al. | 712/24 |
| 7,472,263 | B2 * | 12/2008 | Yokoi | 712/239 |
| 2002/0138236 | A1 * | 9/2002 | Takamura | 702/186 |
| 2004/0215720 | A1 * | 10/2004 | Alexander et al. | 709/204 |
| 2006/0161762 | A1 * | 7/2006 | Eisen et al. | 712/233 |

OTHER PUBLICATIONS

S. Hily et al, "Branch Prediction and Simultaneous Multithreading" *Proceedings of the 1996 Conference on Parallel Architectures and Compilation Techniques* (PACT '96), 1996, pp. 169-173.
R. Morris, "Counting Large Numbers of Events in Small Registers" *Communications of the ACM*, vol. 21, No. 10, Oct. 1978, pp. 840-842.
S. McFarling, "Combining Branch Predictors" *WRL Technical Note TN-36*, Jun. 1993, pp. 1-25.
N. Riley et al, "Probabilistic Counter Updates for Predictor Hysteresis and Bias" *IEEE Computer Architecture Letters*, vol. 5, 2006.
N. Riley et al, "Probabilistic Counter Updates for Predictor Hysteresis and Stratification" IEEE 2006, pp. 111-121.

* cited by examiner

*Primary Examiner*—Jacob Petranek
(74) *Attorney, Agent, or Firm*—Nixon & Vanderhye P.C.

(57) ABSTRACT

A data processing apparatus has processing circuitry for performing processing operations including high priority operations and low priority operations, events occurring during performance of those processing operations. Prediction circuitry includes a history storage having a plurality of counter entries for storing count values, and index circuitry for identifying, dependent on the received event, at least one counter entry and for causing the history storage to output the count value stored in that at least one counter entry, with the prediction data being derived from the output count value. Update control circuitry modifies at least one count value stored in the history storage in response to update data generated by the processing circuitry. The update control circuitry has a priority dependent modification mechanism such that the modification is dependent on the priority of the processing operation with which that update data is associated.

16 Claims, 10 Drawing Sheets

(a) Bimodal Branch Predictor (b) Local Branch Predictor (c) Global Branch Predictor Making BP Prediction Updating BP Prediction

3-bit BHB Counter States

| Bit2 | Bit1 | Bit0 | Prediction |
|---|---|---|---|
| 0 | 0 | 0 | HP Strong Not-Taken - LP Strong Not-Taken |
| 0 | 0 | 1 | HP Strong Not-Taken - LP Weak Not-Taken |
| 0 | 1 | 0 | HP Weak Not-Taken - LP Weak Taken |
| 0 | 1 | 1 | HP Weak Not-Taken - LP Strong Taken |
| 1 | 0 | 0 | HP Weak Taken - LP Strong Not-Taken |
| 1 | 0 | 1 | HP Weak Taken - LP Weak Not-Taken |
| 1 | 1 | 0 | HP Strong Taken - LP Weak Taken |
| 1 | 1 | 1 | HP Strong Taken - LP Strong Taken |

(Bit2 = HP prediction; Bit1, Bit0 = LP prediction)

DATA PROCESSING APPARATUS AND METHOD FOR UPDATING PREDICTION DATA BASED ON AN OPERATION'S PRIORITY LEVEL

BACKGROUND OF THE INVENTION

1. Field of the Invention

The present invention relates to a data processing apparatus and method for generating prediction data used by processing circuitry when performing processing operations, and in particular to techniques for generating such prediction data when the processing operations performed by the processing circuitry include both high priority operations and low priority operations.

2. Description of the Prior Art

Modern data processing systems rely on prediction mechanisms that generate prediction data used by processing circuitry when performing processing operations, such prediction mechanisms often seeking to keep some historical record of previous behaviour for use when generating such prediction data. In particular, many such prediction mechanisms maintain a history storage having a plurality of counter entries for storing count values. On occurrence of an event causing a prediction to be made, one or more of the counter entries are accessed dependent on the event, and prediction data is then derived from the contents of one or more of those accessed counter entries. Such prediction mechanisms can be used in a variety of situations. For example, when branch instructions are executed by the processing circuitry, branch prediction circuitry is typically used to predict whether the branch will be taken or not taken, and the branch prediction circuitry will typically use a history storage to keep a summary of previous branches outcomes for reference when deciding whether to predict a particular branch instruction as taken or not taken. Similarly, prediction circuitry may be provided in association with a cache to predict whether a cache access is likely to result in a cache miss (i.e. a situation where the data seeking to be accessed in the cache is not present within the cache). Furthermore, in some situations, prediction circuitry may be used to predict the result of a processing operation before that processing operation is performed with the aim of increasing processing speed in the event that the prediction is accurate.

Such prediction circuitry can also be used in other areas, for example as part of an eviction mechanism when seeking to determine a storage element of a storage structure whose contents should be evicted from the storage structure, such storage structures being for example a cache, a translation lookaside buffer (TLB) for storing access control information for different memory regions, a branch target buffer (BTB) for strong target addresses of branch instructions, etc.

Whilst correct predictions generally improve performance and hence power efficiency, there is an overhead in maintaining summaries of past behaviour for use by such prediction mechanisms. This overhead is further increased when the various processing operations performed by the processing circuitry are considered to form multiple different categories, each of which requires predictions to be made in respect of them. For example, the processing circuitry may have some operations that are considered high priority operations having a higher priority than other operations that are considered lower priority operations. For example, in a multi-threaded processor core, at least one of the program threads may be considered to be a high priority program thread, whilst at least one other program thread may be considered to be a low priority program thread. Similarly, certain types of processing operation, whether in a multi-threaded processor core or in a single threaded core, may be considered to be higher priority operations than other operations. As an example, considering branch prediction circuitry, direct branch instructions (i.e. instructions where the target address for the branch instruction is specified directly within the instruction) may be considered to be higher priority than indirect branch instructions (i.e. branch instructions where the target address for the branch instruction is not specified directly in the instruction itself and instead is specified elsewhere, for example by the contents of a register identified by the indirect branch instruction). It may be more important for the branch prediction made in respect of direct branch instructions to be more accurate than the branch prediction made in respect of indirect branch instructions, since direct branch instructions often occur more frequently than indirect branch instructions.

To maintain high prediction accuracy for both high priority operations and low priority operations, separate history storage structures could be kept for the different priority operations. However, this would give rise to a significant hardware cost, which in many situations will be considered unacceptable.

As an alternative, the history storage structure maintained by the prediction circuitry may be shared and used to produce prediction data for both high priority operations and low priority operations. However, when such history storage structures are shared, this can give rise to collision, which in many situations can be destructive and significantly reduce prediction accuracy. For example, if a particular counter entry is generally updated in one direction by one type of operation and generally updated in the opposite direction by another type of operation, this may corrupt the prediction data, leading to inaccurate predictions for either of those operations.

Indeed, this problem is discussed in some detail in the article "Branch Prediction and Simultaneous Multithreading" by Sébastien Hily et al, Proceedings of the 1996 Conference on Parallel Architectures and Compilation Techniques. In that paper the performance of different branch predictors is analysed, including the collisions in the prediction tables that can occur when used in a simultaneous multithreaded (SMT) processor core. In that paper it is concluded that if the sizes of the tables (for example a history storage table) are kept small, there is a significant increase in mispredictions.

Accordingly, it would be desirable to provide an improved technique for generating prediction data used by processing circuitry when performing processing operations, in situations where the processing circuitry performs both high priority operations and low priority operations and the history storage is shared for both types of operation.

SUMMARY OF THE INVENTION

Viewed from a first aspect, the present invention provides a data processing apparatus, comprising: processing circuitry for performing processing operations including high priority operations and low priority operations, events occurring during performance of said processing operations; prediction circuitry, responsive to a received event, for generating prediction data used by the processing circuitry in performing said processing operations, the prediction circuitry comprising: a history storage having a plurality of counter entries for storing count values; index circuitry for identifying, dependent on the received event, at least one counter entry and for causing the history storage to output the count value stored in that at least one counter entry, the prediction data being derived from the at least one output count value; update control circuitry, responsive to update data generated by the processing circuitry during performance of said processing operations, for modifying at least one count value stored in the history storage, the update control circuitry having a priority dependent modification mechanism such that the modification to the at least one count value is dependent on the priority of the processing operation with which that update data is associated, the priority dependent modification mechanism being such that the prediction data output for a received event associated with a high priority operation is more accurate than the prediction data output for a received event associated with a low priority operation.

In accordance with the present invention, update control circuitry is provided for modifying at least one count value stored in the history storage of the prediction circuitry in response to update data generated by the processing circuitry during performance of the processing operations. The update control circuitry employs a priority dependent modification mechanism such that the manner in which the count values are updated is dependent on the priority of the processing operation with which any particular piece of update data is associated. By differentiating the modification performed in respect of count values dependent on the priority of the processing operation with which the update data causing the modification is associated, the end effect is that the prediction data then generated by the prediction circuitry when subsequently referencing the history storage based on a received event is more accurate for a received event associated with a high priority operation than it is for a received event associated with a low priority operation.

Accordingly, by such an approach, even though the same history storage is shared for both high priority operations and low priority operations, the prediction accuracy can be skewed in favour of high priority operations. Hence, for a particular amount of memory provided in respect of the history storage, such a technique can provide improved accuracy for high priority operations, and in particular achieve higher accuracy than would otherwise be available using a prior art scheme where priority was not taken into account when updating the history storage.

The priority dependent modification mechanism can be arranged in a variety of ways. However, in one embodiment, the update control circuitry is responsive to the update data to determine whether the at least one count value should be incremented or decremented, and the priority dependent modification mechanism specifies an amount by which the at least one count value is to be incremented or decremented, the priority dependent modification mechanism specifying said amount to be larger for update data associated with a high priority operation than for update data associated with a low priority operation.

Accordingly, by such an approach, update data associated with a high priority operation causes a larger change in the relevant count value than occurs for corresponding update data associated with a low priority operation, which statistically increases the likelihood that a count value is more indicative of the past activities of high priority operations (as indicated by the update data) than of low priority operations, and hence skews the accuracy of the prediction data in favour of high priority operations.

The increment/decrement amounts specified by the priority dependent modification mechanism can take a variety of forms. However, in one embodiment, for at least the update data associated with a low priority operation the priority dependent modification mechanism specifies said amount to be a fractional value. Such a fractional update mechanism can be used to skew the accuracy of prediction towards high priority operations, by allowing the count values to be incremented or decremented by normal integer amounts for update data associated with high priority operations, whilst only performing fractional increments or decrements for update data associated with low priority operations.

In an alternative embodiment, a fractional value may also be specified as an increment/decrement amount for a high priority operation. In such embodiments, the fractional value associated with high priority operations would be larger than the fractional value associated with low priority operations.

In one embodiment, each counter entry can only be incremented or decremented by an integer value, the priority dependent modification mechanism being responsive to update data associated with a low priority operation to perform a probabilistic operation based on the fractional value to determine whether or not to modify the at least one count value. As a result, the priority dependent modification mechanism will sometimes respond to the update data associated with a low priority operation by performing an integer increment or decrement to the relevant counter entry value, whilst on other occurrences of such update data no increment or decrement will be performed, with the effect that over time the counter entry is seen to be updated by a fractional value. The same approach can also be adopted for any high priority operation having a fractional value associated therewith for increment/decrement purposes.

In the general technical area of counter technology, the article "Counting Large Numbers of Events in Small Registers" by Robert Morris, Communications of the ACM, Volume 21, Issue 10, October 1978, provides a general discussion of how probabilistic counters may be used to count a larger number of events than can be represented directly in a register size, and such techniques could be used to implement the probabilistic operation referred to above. However, the counters referred to in that article are not used for prediction purposes, nor is there any discussion of sharing a particular counter between high priority operations and low priority operations, and performing fractional updates in respect of at least the low priority operations so as to skew prediction accuracy in favour of high priority operations.

By performing a probabilistic operation in order to cause fractional updates to the counter entries when at least update data associated with low priority operations is received, this can also give rise to a reduction in energy consumed, as the actual updating of the history storage occurs less frequently. For example, if a particular piece of update data updates the history storage with a probability of ½, the energy consumed in the history storage by this update data will decrease by 50%, since on average the history storage will actually only be updated once on every two occurrences of such update data.

There are a number of ways in which the probabilistic operation may be performed. However, in one embodiment the priority dependent modification mechanism comprises random number generator circuitry to perform the probabilistic operation. For example, if the fractional value to be implemented as the update amount is ¼, then the random number generator circuitry may be arranged to randomly or pseudo-randomly generate a 2-bit random or pseudo-random number expressing values between 0 and 3. The priority dependent modification mechanism may then cause the relevant counter to be updated if the number is 0, and not to be updated if the number is 1, 2 or 3, thereby implementing a fractional update of ¼. In one embodiment the fractional value to be implemented as the update amount may be hardwired (i.e. fixed), but in an alternative embodiment the fractional value may be programmable.

In an alternative embodiment, the priority dependent modification mechanism specifies said amount to be a larger integer for update data associated with a high priority operation than for update data associated with a low priority operation, and the prediction circuitry is arranged to derive the prediction data from a selected portion of the at least one output count value, the selected portion varying dependent on the priority of the processing operation associated with the received event.

Through use of such an approach, the history storage can still be shared between the high priority operations and the low priority operations in a manner in which the prediction accuracy is skewed in favour of the high priority operations in spite of collisions occurring when updating particular counter entries due to update data from both the high priority operations and the low priority operations. Whilst this involves some increase in the size of the history storage in order to establish the different selected portions for the different priority operations, it still involves less hardware than would be required if entirely separate history storage structures were to be provided for the high priority operations and low priority operations, respectfully, and is relatively simple to implement.

In one embodiment, for a received event associated with a high priority operation the selected portion comprises a number of most significant bits of the output count value, and for a received event associated with a low priority operation the selected portion comprises a number of least significant bits of the output count value, at least one bit of the count value being in the selected portion irrespective of whether the received event is associated with a high priority operation or a low priority operation.

The prediction circuitry can take a various of forms. In one embodiment, the prediction circuitry is branch prediction circuitry, the received event identifies the address of a branch instruction to be executed by the processing circuitry, and the prediction data predicts whether the branch identified by the branch instruction will be taken or not taken.

In an alternative embodiment, the processing circuitry employs a cache, the prediction circuitry is a cache miss prediction circuitry, the received event identifies the address of a memory access instruction, and the prediction data predicts whether execution of that memory access instruction will result in a cache miss. If a cache miss can reliably be predicted early, then steps can be taken early to access the required data from another source, for example from a lower level of cache or from memory, thus improving performance. By skewing the prediction accuracy in favour of high priority operations, this will result in improved performance for the high priority operations.

In another embodiment, the prediction circuitry is a value prediction circuitry, the received event identifies a processing operation to be performed by the processing circuitry, and the prediction data provides an indication as to whether a value prediction should be made for that processing operation.

In an alternative embodiment, the prediction circuitry of embodiments of the present invention can be used in association with eviction circuitry for a storage structure. More particularly, in one embodiment, the data processing apparatus further comprises: a storage structure comprising a plurality of storage elements for storing information for access by the processing circuitry; the prediction circuitry being provided within eviction circuitry used to perform an eviction operation to select from a plurality of candidate storage elements a victim storage element whose stored information is to be evicted from the storage structure; the received event being an event identifying that an eviction operation is required; the update data identifying accesses to each storage element, and the history storage having a counter entry for each storage element; whereby when the eviction operation is performed, the index circuitry identifies the counter entries associated with the plurality of candidate storage elements, and the prediction circuitry produces the prediction data dependent on a comparison of the count values in the identified counter entries, the prediction data identifying the victim storage element.

Hence, in such embodiments accesses to storage elements from high priority operations can be given more weight than accesses to storage elements from low priority operations, by virtue of the priority dependent modification mechanism employed by the update control circuitry. Thus, when reviewing the counter entries for a plurality of candidate storage elements for eviction, such a mechanism will ensure that there is an increased tendency to choose as the victim storage element a storage element storing information associated with a low priority operation. As an example, an access to a particular storage element by a high priority operation can be arranged to give rise to a larger increase to the count value in the associated counter entry then would occur for an access by a low priority operation. If the prediction circuitry then identifies the victim storage element to be that storage element amongst the plurality of candidate storage elements having the lowest count value, it can be seen that this will increase the likelihood that the victim storage element stores information associated with a low priority operation rather than a high priority operation. This will hence tend to improve the processing speed of the high priority operations by reducing the chance that required information will not be in the storage structure when a high priority operation seeks to access that information.

The storage structure may take a variety of forms. In one embodiment, the storage structure is a cache and each storage element is a cache line. In an alternative embodiment the storage structure is a TLB and each storage element is a TLB entry. In a further alternative embodiment, the storage structure is a BTB and each storage element is a BTB entry.

Considering the example of a cache, in one embodiment the cache is an n-way set associative cache, and when performing the eviction operation the plurality of candidate storage elements are the plurality of cache lines within a particular set of the cache. Considering the example of a TLB, in one embodiment the TLB is an n-way set associative TLB, and when performing the eviction operation the plurality of candidate storage elements are the plurality of TLB entries within a particular set of the TLB. Similarly, considering the example of a BTB, in one embodiment the BTB is an n-way set associative BTB, and when performing the eviction operation the plurality of candidate storage elements are the plurality of BTB entries within a particular set of the BTB.

The high priority operations and low priority operations may take a variety of forms. However, in one embodiment, the processing circuitry is a multi-threaded processing circuitry having multiple threads of execution, at least one of said threads being specified as a high priority thread, and processing operations occurring during execution of that at least one high priority thread being high priority operations.

In such embodiments, the processing circuitry can take a variety of forms. In one embodiment, the processing circuitry comprises a single processing unit executing multiple program threads. For example, in a multi-threaded processor such as a simultaneous multi-threaded (SMT) processor, a single processor core may be arranged to execute multiple program threads, and there may be various prediction circuits provided in association with shared resources such as a branch predictor, a level 1 cache, a TLB, a BTB, etc, where the history storage in such prediction circuits is shared for both high priority threads and low priority threads.

However, in an alternative embodiment, the processing circuitry comprises a plurality of separate processing units, each processing unit executing at least one program thread. Hence, each processing unit may execute a single program thread, or alternatively one or more of the separate processing units may itself execute more than one program thread, with the various threads then executing on the separate processing units being designated as either a high priority program thread, or a lower priority program thread. As an example of such a system, in a chip multi-processor (CMP) system multiple processor cores may each execute a different program thread, and the various processor cores may share access to a resource such as a level 2 cache, along with associated prediction circuitry.

However, there is no requirement for the different processing operations to relate to different program threads. Instead, or in addition, certain types of processing operation may be specified as high priority operations. For example, considering branch prediction, direct branch instructions may be deemed to give rise to high priority operations and indirect branch instructions may be deemed to give rise to low priority operations.

In one embodiment, the priority information may be identified in each instruction executed by the processing circuitry, thereby giving a great deal of flexibility as to the specification of high priority operations and low priority operations.

Viewed from a second aspect, the present invention provides a method of operating prediction circuitry to generate, in response to a received event, prediction data for processing circuitry of a data processing apparatus, the processing circuitry performing processing operations including high priority operations and low priority operations, and events occurring during performance of said processing operations, the method comprising the steps of: maintaining a history storage having a plurality of counter entries for storing count values; identifying, dependent on the received event, at least one counter entry and causing the history storage to output the count value stored in that at least one counter entry; deriving the prediction data from the at least one output count value; responsive to update data generated by the processing circuitry during performance of said processing operations, modifying at least one count value stored in the history storage, said modifying being performed by a priority dependent modification mechanism such that the modification to the at least one count value is dependent on the priority of the processing operation with which that update data is associated; the priority dependent modification mechanism being such that the prediction data output for a received event associated with a high priority operation is more accurate than the prediction data output for a received event associated with a low priority operation.

Viewed from a third aspect, the present invention provides a data processing apparatus, comprising: processing means for performing processing operations including high priority operations and low priority operations, events occurring during performance of said processing operations; prediction means, responsive to a received event, for generating prediction data used by the processing means in performing said processing operations, the prediction means comprising: a history storage means having a plurality of counter entry means for storing count values; index means for identifying, dependent on the received event, at least one counter entry means and for causing the history storage means to output the count value stored in that at least one counter entry means, the prediction data being derived from the at least one output count value; update control means, responsive to update data generated by the processing means during performance of said processing operations, for modifying at least one count value stored in the history storage means, the update control means having a priority dependent modification mechanism such that the modification to the at least one count value is dependent on the priority of the processing operation with which that update data is associated, the priority dependent modification mechanism being such that the prediction data output for a received event associated with a high priority operation is more accurate than the prediction data output for a received event associated with a low priority operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

As mentioned earlier, prediction mechanisms can be used in a variety of situations within a data processing apparatus. For the purposes of describing one embodiment of the present invention, branch prediction circuitry will be considered that is used to make predictions in respect of branch instructions executed by processing circuitry of a data processing apparatus. For the purposes of describing an embodiment of the present invention, it will be assumed that the processing circuitry takes the form of a multi-threaded processor core such as an SMT processor core, a fine grained multi-threaded processor core or a coarse grained multi-threaded processor core. It will be assumed that such a multi-threaded processor core executes a plurality of program threads, including at least one high priority program thread, and at least one lower priority program thread.

Figure 1A:
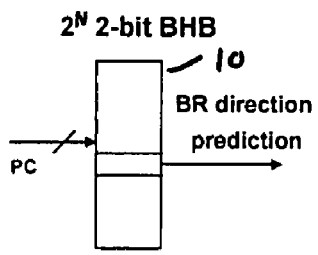
FIGS. 1A to 1C schematically illustrate different types of branch predictors.
Figure 1B:
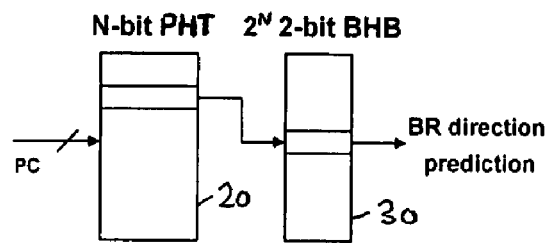
Figure 1C:
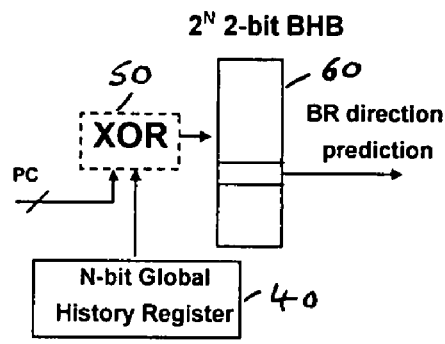

There are a number of different types of branch predictor that are well known, and three types of such branch predictor are illustrated schematically in FIGS. 1A to 1C. A key purpose of the branch predictor is to predict the branch direction on occurrence of a branch instruction, i.e. whether the branch will be taken or not taken. All of the example branch predictors in FIGS. 1A to 1C employ a history storage in a form of a branch history buffer (BHB) which keeps summary information about the direction a branch took the last few times it was executed. Typically, such BHBs are 2-bit BHBs, consisting of a plurality of BHB entries, each of which can hold a 2-bit value.

The article "Combining Branch Predictors" by Scott McFarling, Technical Note TN-36, Digital Equipment Corporation, June 1993, includes a general discussion of the bimodal, local and global branch predictors such as illustrated in FIGS. 1A to 1C. Considering first the bimodal branch predictor of FIG. 1A, such a predictor makes a prediction based on the direction the branch instruction went the last few times it was executed. The behaviour of typical branches is far from random, and most branches are either usually taken or usually not taken. Bimodal branch prediction takes advantage of this bimodal distribution of branch behaviour and attempts to distinguish usually taken from usually not-taken branches. As shown in FIG. 1A, the BHB 10 maintains a table of counters, which are indexed by the low order address bits of a program counter value identifying a current branch instruction. Each counter is 2 bits long, and for each taken branch the appropriate counter is incremented. Likewise for each not-taken branch, the appropriate counter is decremented. In addition, the counter is saturating so that it is not decremented past zero nor is it incremented past three. The most significant bit of a counter determines the prediction that is made when the program counter for a particular branch instruction indexes to that counter in the BHB. By using a 2-bit counter, the predictor can tolerate a branch going in an unusual direction one time and keep predicting the usual branch direction.

One way to improve on bimodal prediction is to recognise that many branches execute repetitive patterns. The local branch predictor illustrated in FIG. 1B is intended to take advantage of such repetitive patterns. The local branch predictor of FIG. 1B has two tables, a first table 20 being a pattern history table (PHT) which seeks to record the history of recent branches. There are many different organisations that are possible for this table, but in one example it is simply an array indexed by the low-order bits of the branch address. Each PHT entry records the direction taken by the most recent N branches whose addresses map to this entry, where N is the length of the entry in bits. Typically each PHT entry is formed as a shift register whose contents are shifted by 1 when a branch indexing to that entry is taken and shifted by 0 when a branch indexing to that entry is not taken. A second table 30 is a BHB providing an array of two-bit counters identical to those used for bimodal branch prediction. However, in accordance with the local branch predictor, these two-bit counters are indexed by the branch history stored in the first table.

In the local branch prediction scheme, the only patterns considered are those of the current branch. Another scheme is the global branch prediction scheme illustrated schematically in FIG. 1C, which is able to take advantage of other recent branches to make a prediction. A global history register (GHR) 40 is provided to record the direction taken by the most recent N conditional branches. This GHR 40 can be arranged as a shift register in the same way as individual entries of the PHT 20 of FIG. 1B are. The output from the GHR 40 can be used directly as an index into the BHB 60, which again is an array of two-bit counters identical to those used for bimodal branch prediction. However, alternatively, some combination of the current branch address as indicated by the program counter value and the output from the GHR can be used to generate the index into the BHB 60. In one embodiment, a concatenation of the GHR output and certain branch address bits can be used to index into the BHB. However, in an alternative embodiment as illustrated in FIG. 1C, both the program counter value and the output from the GHR 40 are subjected to an exclusive OR (XOR) operation 50 in order to generate an index into BHB 60.

Figure 2A:
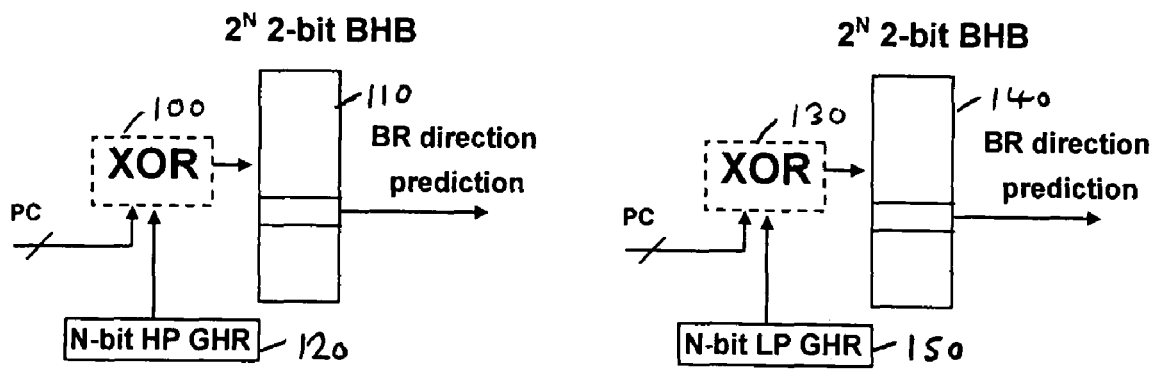
FIG. 2A schematically illustrates a replicated branch predictor, and FIG. 2B schematically illustrates a shared branch predictor.

For the purposes of the following embodiment description, it will be assumed that a global branch predictor such as illustrated in FIG. 1C is used to form the prediction circuitry. For a multi-threaded processor core, the branch prediction circuitry could be replicated for each thread as shown in FIG. 2A, which illustrates the situation for a multi-threaded processor core having a single high priority (HP) thread and a single low priority (LP) thread. Each thread tracks its own global history through a GHR 120, 150. For the replicated branch predictor of FIG. 2A, a separate BHB 110, 140, respectively, is also kept for each thread. Accordingly, separate XOR functions 100, 130 are provided in association with each GHR/BHB structure. Whilst such an approach would give the best branch prediction performance because there would not be any collisions in the BHB array between the high priority and low priority threads, it does give rise to the highest hardware cost, which in many situations would be considered unacceptable.

Figure 2B:
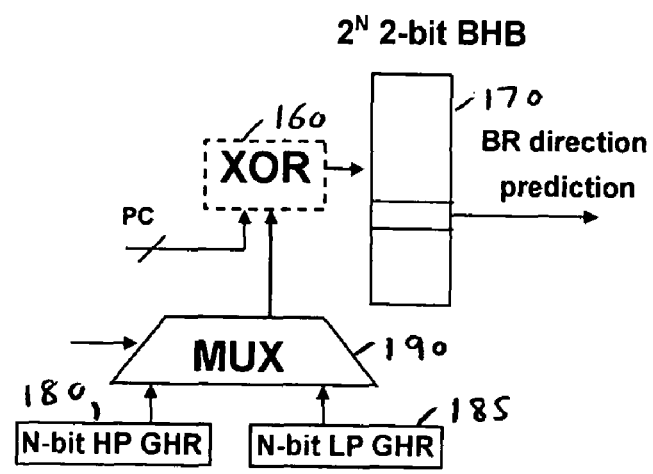

FIG. 2B shows an alternative approach where a shared branch predictor is used. Here, the GHR is replicated for the high priority and low priority threads, and hence an HP GHR 180 and a LP GHR 185 are provided. However, the relatively large BHB array is shared amongst the threads, and accordingly a single BHB 170 is provided. A multiplexer 190 is driven by a control signal which is set dependent on whether the current branch instruction for which a prediction is required is occurring within a high priority thread or a low priority thread, so as to couple the relevant GHR 180, 185 to the XOR function 160, which also receives the program counter value of the branch instruction. Thereafter, the branch prediction is performed as described earlier with reference to FIG. 1C. The approach illustrated in FIG. 2B is significantly less costly than the approach of FIG. 2A, but collisions will occur in the shared BHB array 170 between the threads, which can potentially cause a drop in branch prediction performance for all threads. Whilst this may be tolerable in a multi-threaded system where all threads have equal priorities, it can give rise to adverse effects in a system having at least one high priority thread (such as a real time thread), and at least one lower priority thread (such as a non real-time, non-critical thread).

To address this problem, as will be discussed in more detail with reference to the remaining figures, a technique is provided where the BHB continues to be shared, but the branch prediction accuracy is skewed in favour of the high priority thread at the cost of reduction in the branch prediction accuracy of the low priority thread. By such an approach, the aim is to keep the prediction accuracies of high priority threads at a certain maximum while providing decent prediction accuracies for low priority threads.

Figure 3:
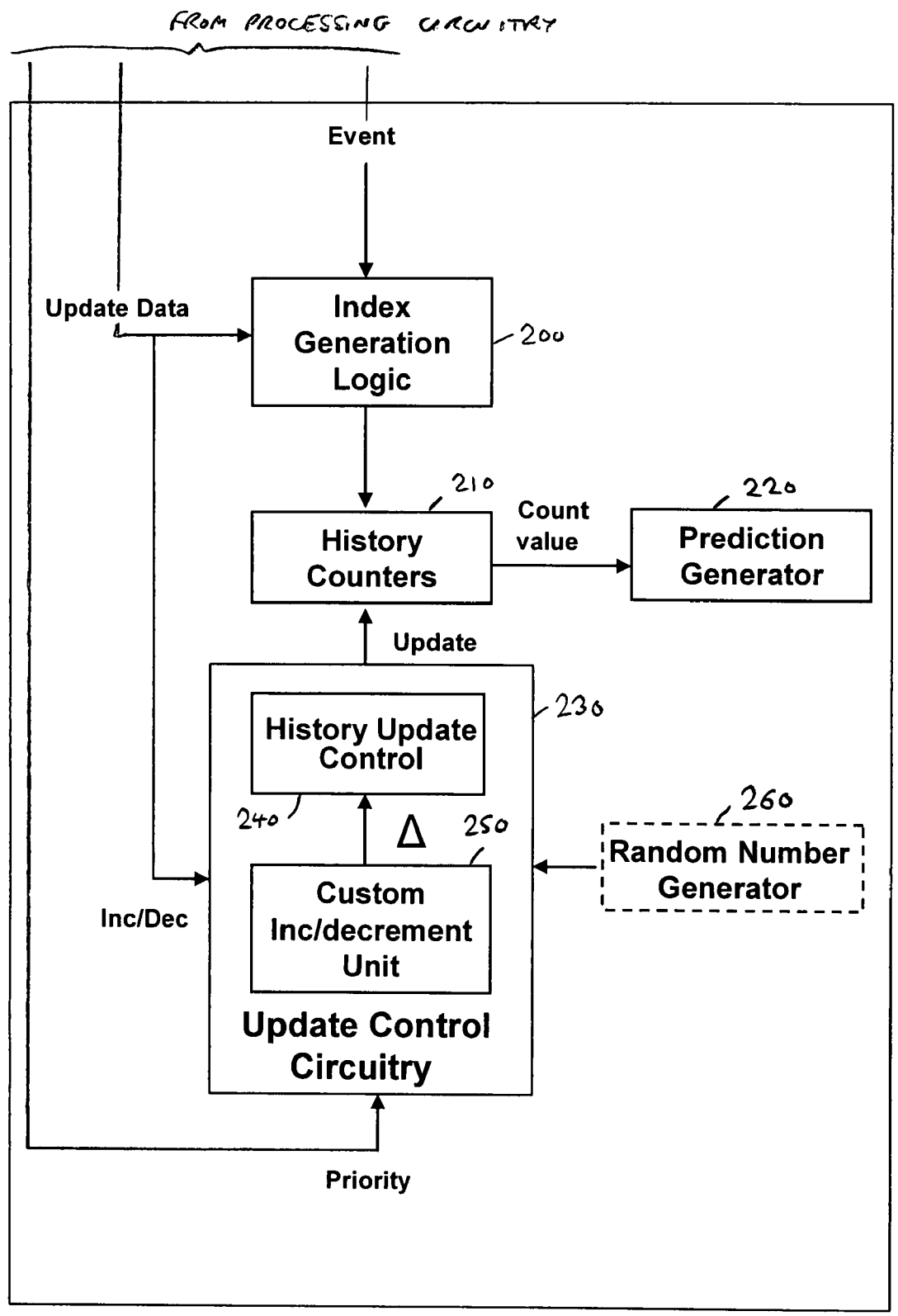
FIG. 3 is a block diagram schematically illustrating prediction circuitry of a data processing apparatus in accordance with one embodiment of the present invention.

FIG. 3 is a general block diagram of prediction circuitry that may be used in accordance with embodiments of the present invention. For the purposes of describing FIG. 3, the prediction circuitry can be any type of prediction circuitry maintaining history counters 210 which are shared for both high priority operations and low priority operations of associated processing circuitry, and accordingly FIG. 3 is not restricted to the branch prediction example discussed earlier where the history counters are formed by the BHB.

When the processing circuitry is performing processing operations, events will occur which give rise to the need for a prediction to be made by the prediction circuitry of FIG. 3, and such events will be forwarded to the index generation logic 200 which will generate an index into the history counters 210 dependent on the event. The counter entry amongst the history counters 210 that is identified by the index produced by the index generation logic 200 will then output its count value to the prediction generator 220, which will then produce prediction data dependent on the value of that count value. In some embodiments multiple counter entries will be indexed by an event, and the prediction generator 220 will produce prediction data dependent on a comparison of the associated counter values.

Considering the earlier example of branch prediction circuitry, an event will be received by the index generation logic 200 identifying the address of a branch instruction and that will be used (in combination with the GHR assuming a global branch prediction mechanism is used) to generate an index into one of the counter entries of the history counters 210, with the count value then being output to the prediction generator 220.

As another example, if the prediction circuitry is cache miss prediction circuitry, then the event received by the index generation logic 200 will identify the address of a memory access instruction, and this will be used to index into one of the counter entries of the history counters 210, in order to produce a count value for output to the prediction generator 220. Dependent on the count value, the prediction generator 220 will then predict whether execution of that memory access instruction will result in a cache hit or a cache miss.

As another example, the prediction circuitry may be value prediction circuitry and the received event input to the index generation logic 200 may identify a processing operation to be performed by the processing circuitry. The history counters in this example may store prediction information used to decide whether a value prediction should be made or not for a variety of processing operations, and dependent on the event received, the index generation logic will identify one of the counter entries whose count value will be forwarded to the prediction generator 220 in order for a value prediction to be made if required having regard to the count value.

In accordance with a yet further embodiment, the prediction circuitry may be associated with eviction circuitry used to evict the contents of storage elements from a storage structure as and when required to free up space for new content. For example, such a storage structure may be a cache comprising a plurality of cache lines, and when new data is to be stored in the cache, it is first necessary to select a victim cache line whose contents are to be evicted to make space for the new content. The history counters may be used to keep a record of accesses to particular cache lines. In such embodiments, an event will be issued to the index generation logic 200 whenever there is a need to select a victim cache line from a cache. Typically, given a particular address associated with new content to be stored in a cache, this will identify a plurality of candidate cache lines that can be chosen as victim cache lines, and the index generation logic 200 will be arranged in such instances to identify the counter entries associated with such candidate cache lines, and to cause the count values stored in those identified counter entries to be output to the prediction generator 220. In one embodiment, the prediction generator then predicts as the victim cache line the cache line associated with the lowest count value received by it from the history counters 210.

In accordance with embodiments of the present invention, prediction accuracy is skewed in favour of high priority operations through use of novel update control circuitry 230 which updates the count values in the various counter entries of the history counters 210 dependent on update data received from the processing circuitry. In particular, from time to time update data will be output from the processing circuitry which can be routed to the index generation logic 200 in order to identify particular counter entries in the history counters 210. For the branch prediction example discussed earlier, such update data may identify whether a particular branch instruction was in fact taken or not taken. For the cache miss prediction circuitry example, such update data may identify whether a particular access did in fact miss or hit in the cache. Similarly, for the value prediction circuitry, the update data may identify whether a value prediction was in fact correct or not for a particular processing operation. Further, considering the eviction example discussed earlier, such update data will typically identify any accesses in the cache so as to cause the history counters to be updated depending on such access activities.

The update data is used by the index generation logic 200 to identify a particular counter entry to be updated. Further, this information is used by the update control circuitry 230 to identify the type of update that is required. Generally, this will hence identify whether the relevant history counter entry should be incremented or decremented.

The update control circuitry 230 will in addition receive priority information indicating the priority of the processing operation with which the update data is associated and this will be used by the update control circuitry 230 to decide the amount by which the identified history counter entry should be incremented or decremented. The amounts may be predetermined for different priority operations. For example update data associated with a high priority operation may cause a larger integer update than the integer update for update data associated with a low priority operation. In such embodiments, as will be discussed later with reference to FIGS. 7 to 9, the size of each individual history counter entry is typically expanded so that different portions of the history counter entry can be used for making predictions for events associated with high priority operations and events associated with low priority operations. As an alternative, a predetermined probabilistic update operation may be performed by the history update control circuitry 240 for at least low priority processing operations, so as to in effect produce fractional updates for at least update data associated with a low priority operation. In such embodiments, a random number generator 260 can be used to produce true random or pseudo-random numbers, and the history update control circuitry 240 would decide either to update the history counter entry or not update the history counter entry, dependent on the value of the random number.

Hence, as an example, if for low priority operations it is desired to perform a fractional update of ¼, then the random number generator 260 may be arranged to produce random numbers between 0 and 3, and the history update control circuitry 240 may be arranged to cause an integer update to take place if the random number is 0, and no update to take place if the random number is 1, 2 or 3. Such a fractional update mechanism may also be used for high priority operations, although in such instances the amount of the fractional update would be larger than the amount used for low priority operations, so as to maintain a skew in prediction accuracy towards high priority operations.

Whilst the specified update amounts for both high priority operations and low priority operations may be predetermined, in an alternative embodiment a custom increment/decrement unit 250 can be provided to enable the actual amounts of the increments and decrements to be programmed for particular implementations. Hence, considering the different integer amounts example discussed earlier, the custom increment/decrement unit may be programmed to specify the amount of increment for each type of operation and to output a delta value to the history update control circuitry identifying that amount. For example, in one embodiment; it may output a delta value of 1 for a low priority operation and a delta value of 2 for a high priority operation, identifying that the history counter should be updated by 1 for low priority operations and should be updated by an amount of 2 for high priority operations. Similarly, for fractional updates, the custom increment/decrement unit 250 may be programmed to specify the fractional value. For example, considering an example where direct branch instructions are considered to be high priority operations and indirect branch instructions are considered to be low priority operations, the random number generator 260 may be arranged to produce random numbers between 0 and 6, and the custom increment/decrement unit may produce a delta value of 2 for indirect branch instructions and a delta value of 5 for direct branch instructions. The history update control circuitry 240 would then interpret these delta values such that for indirect branch instructions, the update will only take place if a random number of 0 or 1 is produced by the random number generator 260, whereas for direct branch instructions an update will occur if the random number generator produces a random number of 0, 1, 2, 3 or 4.

It will be appreciated that by virtue of the above described technique, different update amounts are associated with high priority operations and low priority operations, respectively. These may either be different integer amounts with a larger integer amount being associated with a high priority operation, an integer amount for a high priority operation and a fractional amount for a low priority operation, or different fractional amounts for high priority and low priority operations, with a higher fractional amount be associated with a high priority operation. As a result of the way in which the history counters are updated, this has an effect on the prediction made by the prediction generator 220 for the events received by the prediction circuitry, since the update mechanism skews the prediction in favour of the high priority operation. For example, considering the earlier mentioned branch prediction example, if a particular history counter entry is indexed by a high priority branch instruction which is predominantly taken, and also by a low priority branch instruction which is predominantly not taken, the overall effect of the update mechanism will be that the history counter entry will be skewed towards an indication of taken, thereby giving high prediction accuracy for the high priority branch instruction.

Figure 4A:
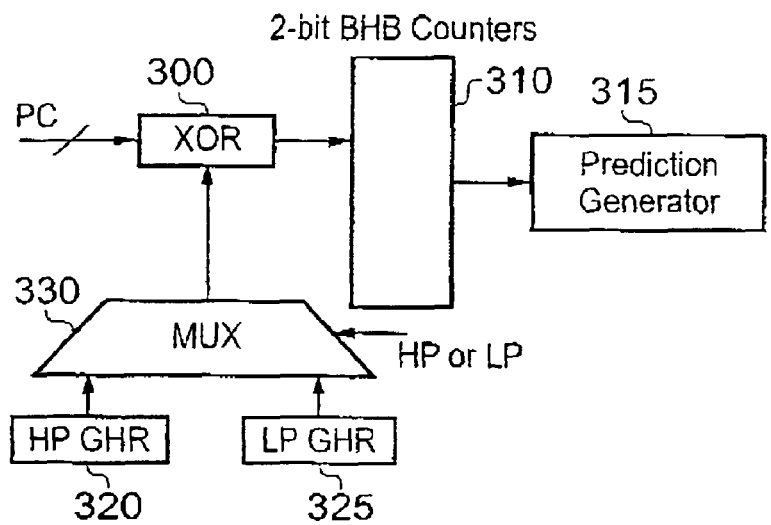
FIGS. 4A and 4B schematically illustrate the manner in which a branch history buffer of a branch predictor is used and updated, respectively, in accordance with one embodiment of the present invention.
Figure 4B:
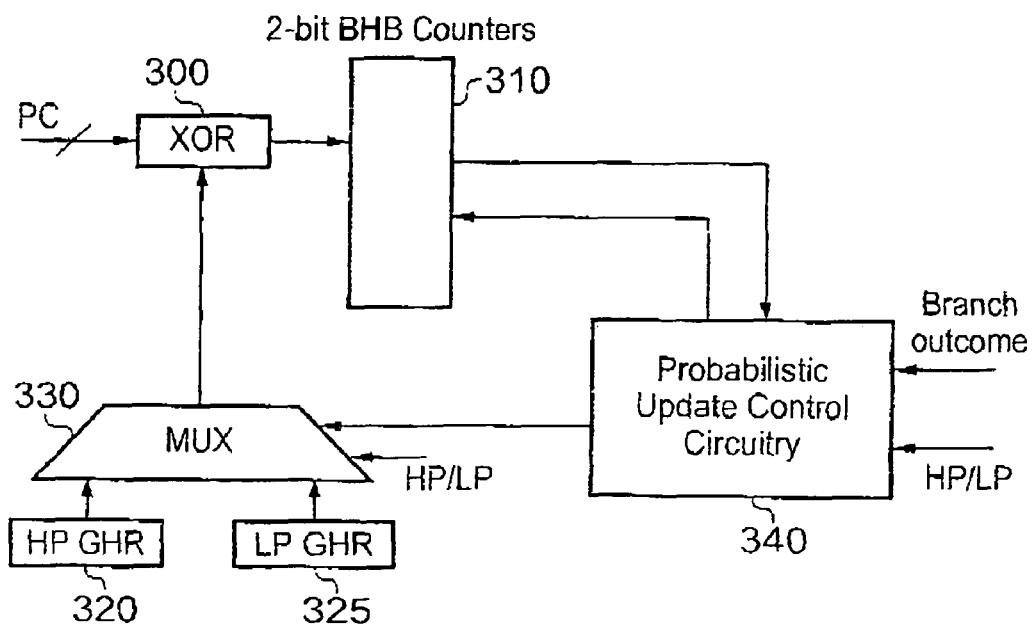

FIGS. 4A and 4B illustrate the operation of the earlier-mentioned global branch prediction mechanism when used in association with update control circuitry of embodiments in the present invention. Considering first FIG. 4A, the elements 300, 310, 320, 325, 330 correspond with the elements 160, 170, 180, 185, 190 of FIG. 2B, and operate in the same manner. The output from the relevant 2-bit BHB counter is routed to the prediction generator 315 to cause prediction data to be generated. By comparison with FIG. 3, the index generation logic 200 can be considered to comprise the XOR function 300, the multiplexer 330 and the HP GHR and LP GHR 320, 325, respectively. The BHB counters 310 form the history counters 210 of FIG. 3, and the prediction generator 315 is analogous to the prediction generator 220 of FIG. 3.

Considering now FIG. 4B, the operation of the update control circuitry 340 is schematically illustrated. For this example embodiment, the update control circuitry is a probabilistic update control circuitry which causes fractional updates to take place for low priority operations, and accordingly in this example the update control circuitry 340 includes the random number generator 260 of FIG. 3. The update control circuitry receives as update data branch outcome information identifying whether a particular branch was taken or not taken and also receives a priority signal identifying whether the branch instruction in question is associated with a high priority operation or a low priority operation, for example considering the multi-threaded example of earlier, whether the branch instruction is an instruction executed by a high priority thread or a low priority thread. The program counter value of the relevant branch instruction is forwarded to the XOR function 300.

As shown in FIG. 4B, the probabilistic update control circuitry 340 can read the contents of an indexed counter from BHB 310 and can write back a new value to that BHB counter. Further, the update control circuitry issues an enable signal to the multiplexer 330 such that if it is determined that an update should take place, the multiplexer is enabled, whilst if it is determined that an update should not take place, the multiplexer 330 is disabled.

The operation of the probabilistic update control circuitry 340 will now be described in more detail with reference to FIG. 5. In this example, it is assumed that there is no custom increment/decrement unit 250, and instead the update control circuitry is arranged for branch instructions associated with a high priority thread to increment the relevant counter by 1 if the branch outcome indicates the branch was taken, and to decrement the relevant counter by 1 if the branch outcome indicates that the branch was not taken. In the case of the low priority thread, the decision as to whether the counter value should be updated or not is made by the random number generator 360, which generates values between 0 and N−1. In this particular example, if a random number of 0 is produced an update is made and if any other random number is generated an update is not made. Accordingly, the history update control circuitry 350 will enable the multiplexer 330 for all high priority branch outcome occurrences but for low priority branch outcome occurrences, the multiplexer 330 will only be enabled 1/N of the time (in this example when the value 0 is produced by the random number generator 360). In one particular example, N may be set equal to 2, so that random numbers of 0 or 1 are produced, and in this instance the multiplexer 330 is hence enabled 50% of the time on average for branch outcomes issued in connection with the low priority thread.

Whenever the multiplexer is enabled, a particular entry in the BHB counter is indexed by the XOR function 300, and the contents of that counter are read by the history update control logic 350. That value is then incremented or decremented as appropriate, and the revised value is then returned to the BHB 310 for storing in the relevant counter.

Figure 5:
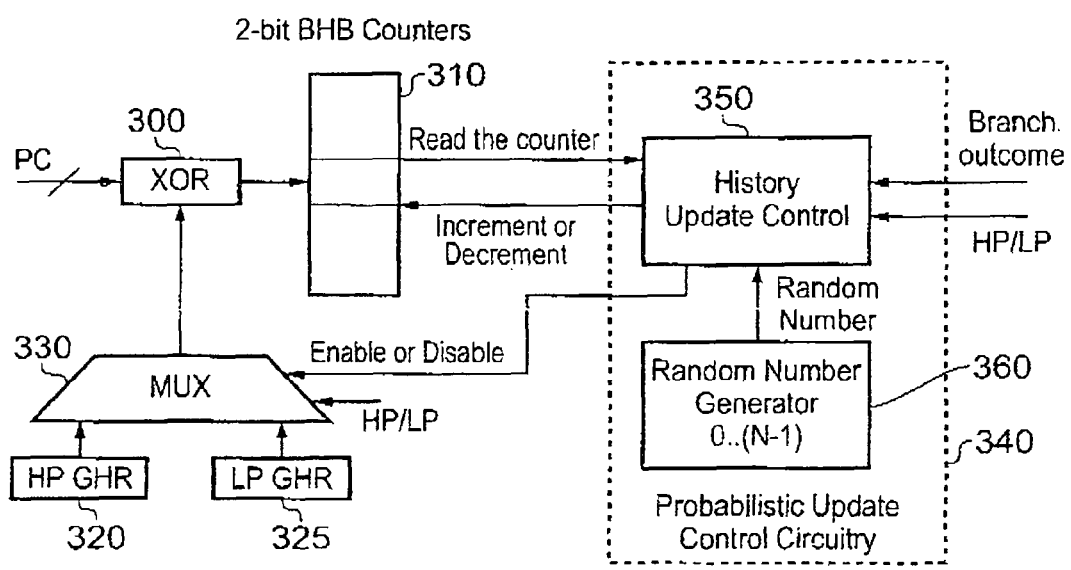
FIG. 5 is a diagram illustrating more detail of the probabilistic update control circuitry of FIG. 4B in accordance with one embodiment of the present invention.
Figure 6:
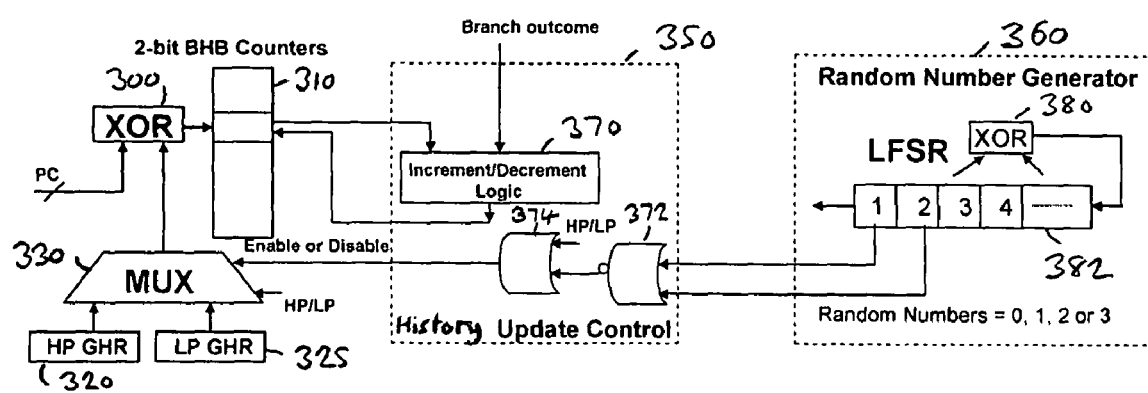
FIG. 6 is a block diagram illustrating an example implementation of the probabilistic update control circuitry of FIG. 4B in accordance with one embodiment of the present invention.

FIG. 6 shows a specific implementation of the probabilistic update control circuitry 340 of FIG. 5, for a situation where for low priority branch outcomes, the relevant counter entry is only updated ¼ of the time. In this example, the random number generator 360 uses a linear feedback shift register (LFSR) 382. Initially, a random number is written into the LFSR 382, and then on every clock cycle the data in the LFSR is shifted left by an input derived by XORing some of the bits in the register using the XOR function 380. When required, the most significant 2 bits in the LFSR register are output to the history update control logic 350.

Accordingly, it can be seen that these 2 bits will either encode 0, 1, 2 or 3. Within the history update control circuitry 350, these 2 bits from the LFSR 382 are received as inputs to a NOR gate 372, which will only produce a logic 1 output if both input bits are 0, i.e. a random number of 0 is represented. Hence, the output from the NOR gate 372 will only typically be set to a logic 1 value ¼ of the time. The output from the NOR gate 372 is pasted through an OR gate 374, which also receives an indication as to whether the branch outcome is associated with a high priority thread or a low priority thread (a logic 1 value indicating a high priority thread and a logic 0 value indicating a low priority thread), with the output from that OR gate then driving the multiplexer 330. Accordingly, for a high priority thread, the output from the OR gate 374 will always be a logic 1 value and the multiplexer 330 will always be enabled. For a low priority thread, the output from the OR gate 374 will only be set if the output from the NOR gate 372 is set, and accordingly the multiplexer 330 will only be enabled ¼ of the time.

When the multiplexer is enabled, then as discussed earlier, a particular BHB counter will be accessed, and its contents will be read by the history update control circuit 350, and in particular will be received by the increment/decrement logic 370 which also receives the branch outcome. If the branch outcome indicates the branch was taken, then the current counter value will be incremented, whereas otherwise it will be decremented, with a revised value being written back to the relevant counter entry.

The LSFR scheme illustrated in FIG. 6 is just one known technique for implementing a pseudo-random number generator, and it will appreciated that alternative techniques can also be used in order to implement a pseudo-random or true random number generator.

As an alternative to retaining 2-bit BHB counters, and using fractional updates for at least updates associated with a low priority operation, an alternative embodiment is to increase the size of each counter, and use differential integer updates to distinguish between high priority operations and low priority operations. Such an embodiment is illustrated schematically in FIG. 7 for a branch predictor using the earlier-mentioned global branch prediction mechanism. The elements 400, 420, 425, 430 operate in the same manner as elements 300, 320, 325, 330 discussed earlier with reference to FIG. 4A. However, in this instance, the BHB 410 includes 3-bit counters and the update control circuitry 450 responds to received branch outcome information by incrementing/decrementing an identified counter entry by 1 for a low priority operation and by 2 for a high priority operation.

Figures 7, 8:
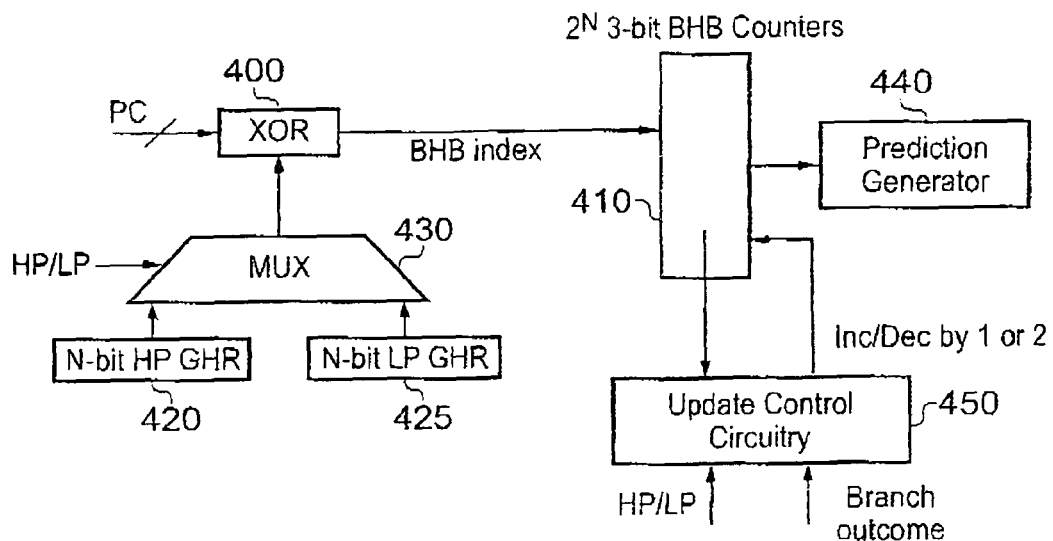
FIG. 7 illustrates the use of an alternative form of branch history buffer that may be used in accordance with one embodiment of the present invention.
FIG. 8 is a table illustrating the various states that may be indicated by the 3-bit BHB counters used in FIG. 7 in accordance with one embodiment of the present invention.

The manner in which the prediction generator 440 then makes a prediction for a particular branch instruction is then illustrated schematically in FIG. 8. In particular it will be seen that the first 2 bits (i.e. the least significant 2 bits) in the 3-bit BHB entry determine the branch prediction direction of a LP thread, whilst the last 2 bits (i.e. the most significant 2 bits) determine the branch prediction direction of a HP thread. Bit 1 is shared between the HP and the LP threads. Hence, when the prediction generator 440 is making a prediction in respect of a branch instruction issued by a low priority thread, it considers only the least significant 2 bits from the BHB entry. Similarly, when the prediction generator 440 is making a prediction for a branch instruction issued by a high priority thread, it considers only the most significant 2 bits from the BHB entry.

Upon branch execution, if an LP thread branch was taken, then the BHB counter is incremented by 1. If instead it was not taken, the counter is decremented by 1. This operation is exactly the same as the 2-bit traditional BHB scheme. On the other hand, if upon branch execution, a high priority thread branch was taken, then the BHB counter is incremented by 2. Similarly, if it was not taken, the counter is decremented by 2. The values are incremented or decremented by 2 because when making predictions in respect of high priority threads, the prediction generator 440 only cares about the most significant 2 bits of the 3-bit BHB counter.

As will be appreciated from a review of FIG. 8, this 3-bit BHB organisation skews the branch prediction accuracy in favour of the HP thread because it requires two successive LP increments or decrements in the same BHB entry in order to corrupt the HP branch prediction state. For instance, if it is assumed that the current counter value is 100 (i.e. "HP weak taken" and "LP strong not-taken") in a BHB entry accessed for a branch instruction issued by the LP thread, the prediction generator 440 will predict that that branch instruction will be not taken. If later upon execution, that branch instruction is in fact taken, the counter in the same BHB entry is again accessed and then incremented by 1, such that the new counter value becomes 101 (i.e. "HP weak taken" and "LP weak not-taken"). It should be noted that this change in the LP branch prediction state does not modify the HP branch prediction state, so the HP state is not affected. It will only change if the LP thread later again accesses the same BHB entry and predicts not taken when in fact later the relevant branch instruction is taken.

In contrast, if the HP thread increments a counter value (e.g. 100) by 2 because a branch instruction issued by the HP thread is taken, the new counter value would be 110 (i.e. "HP strong taken" and "LP weak taken"). The new counter value indicates that the LP branch prediction state changes from strong not-taken to weak taken in one step. Thus, a change in HP prediction state can change the LP state immediately in the opposite direction. Due to this behaviour, it is clear that the branch predictor is skewed to provide better HP thread prediction accuracies than are available for low priority threads.

Figure 9:
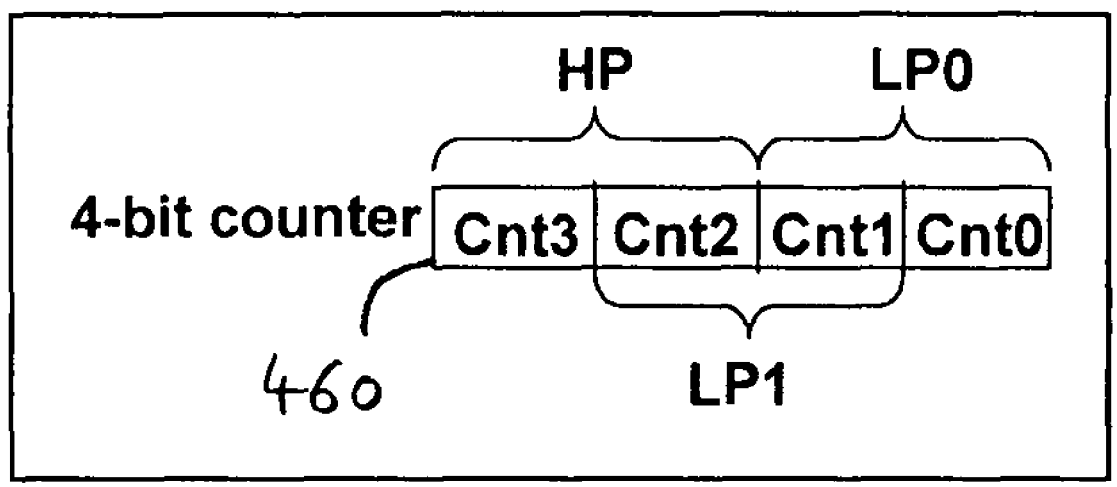
FIG. 9 illustrates an alternative size counter that may be used in the arrangement of FIG. 7 in accordance with one embodiment of the present invention.

It should be noted that whilst in FIGS. 7 and 8, only two threads are considered, the scheme can support more than one high priority thread and more than one low priority thread using the same 3-bit BHB array. In particular, for a multi-threaded system supporting more than two threads, the 3-bit BHB can be shared as any HP threads share the most significant 2 bits while any LP threads share the first two bits in the counter. Although the 3-bits can be shared for all threads, the width of the counters can also be extended with the increasing number of threads. For instance, as illustrated in FIG. 9, 4-bit counter entries 460 can be used to represent a three thread system in which one thread is high priority and the other two threads are low priority threads. Here, low priority thread 0 (LP0), low priority thread 1 (LP1) and the high priority thread (HP) use the first, middle and last 2 bits in each counter entry 460, respectively. To update the BHB, the LP0, LP1 and HP updates increment/decrement the relevant counter entry by 1, 2 and 4 respectively.

Figure 10:
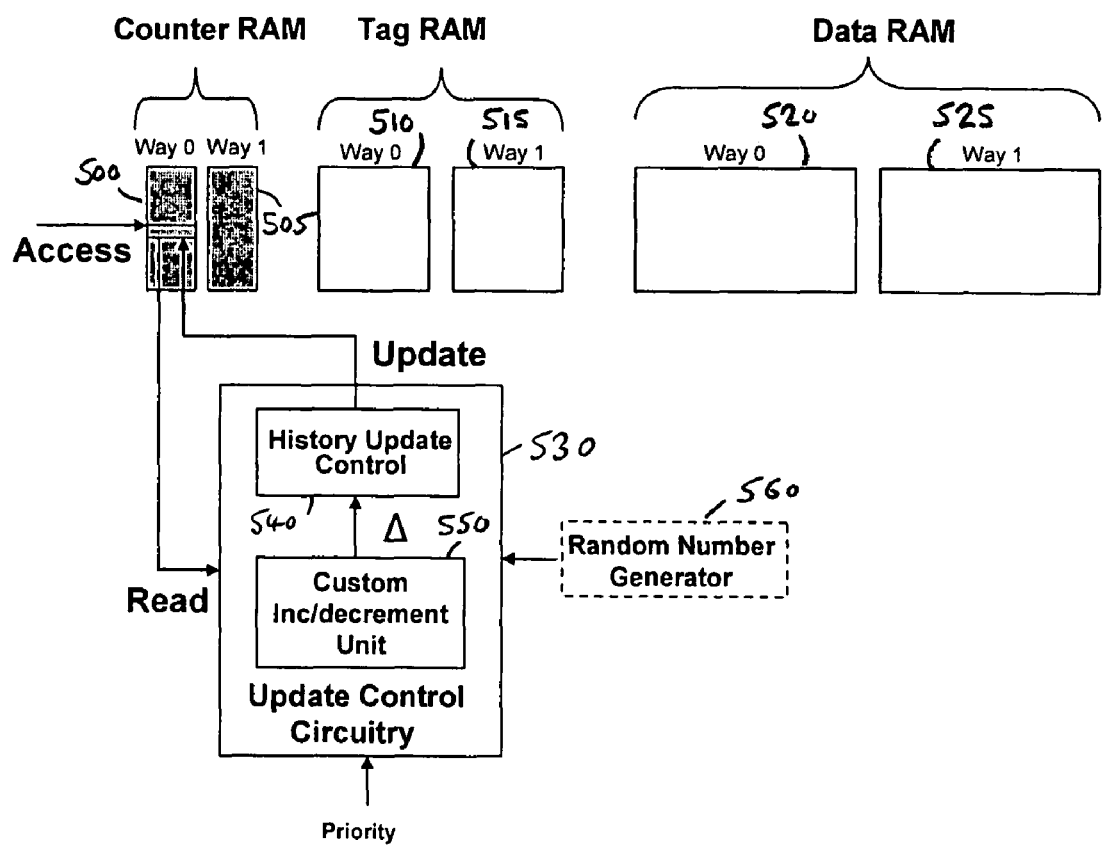
FIG. 10 illustrates an alternative embodiment of the present invention where counters are used to keep track of accesses to cache lines in particular ways of a cache.
Figure 11:
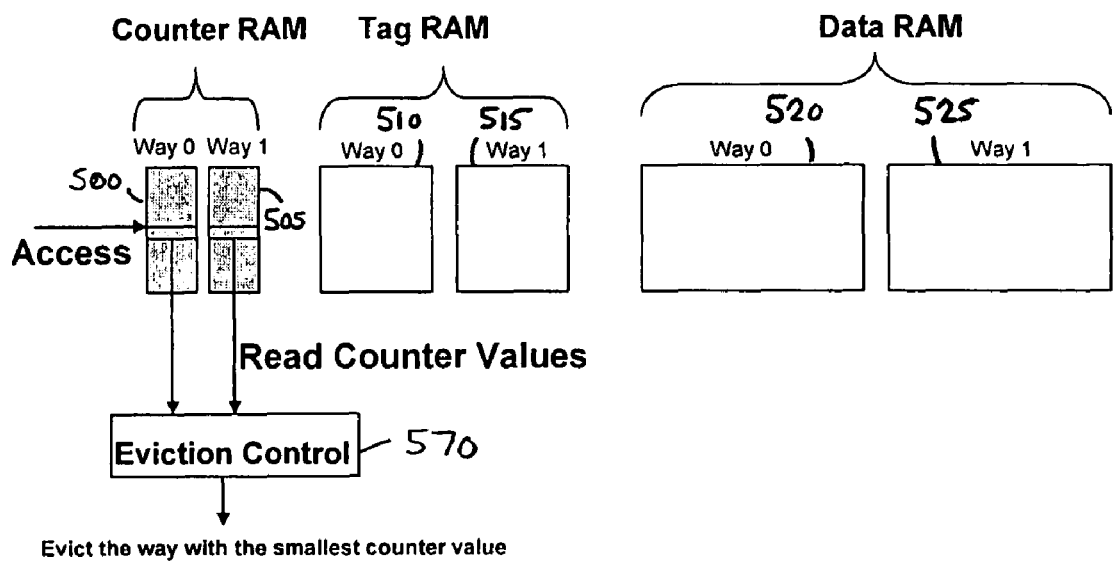
FIG. 11 is a diagram schematically illustrating how the contents of the counters maintained in FIG. 10 are used when selecting a victim cache line for eviction in accordance with one embodiment of the present invention.

FIGS. 10 and 11 illustrate an alternative embodiment of the present invention where the prediction circuitry is used in association with eviction circuitry of a cache to select a victim cache line for eviction. In particular, a 2-way set associative cache is illustrated consisting of a tag RAM having tag RAM portions 510, 515 associated with ways 0 and 1 respectively, and a data RAM having data RAM portions 520, 525 associated with ways 0 and 1 respectively. In this example, the history counters of the prediction circuitry take the form of counter RAM portions 500, 505 associated with ways 0 and 1 respectively. Each counter entry is associated with a cache line in the data RAM, and maintains a count value indicative of the number of times that cache line has been accessed.

In particular, as shown in FIG. 10, when a particular cache line is accessed, the current value of the relevant counter is read by the update control circuitry 530, and its value is then updated dependent on whether the access is occurring from a high priority thread or a low priority thread. In the example illustrated in FIG. 10, it is assumed that fractional updates are performed in respect of at least the low priority thread, and accordingly the history update control 540, custom increment/decrement unit 550 and random number generator 560 operate in an analogous manner to that discussed earlier with reference to the elements 240, 250 and 260 of FIG. 3.

When it is determined that an eviction of a cache line is required, due to the need to store within the cache new data at a specified memory address, then that memory address will typically identify a particular set of the cache. For the 2-way set associative cache shown in FIGS. 10 and 11, this will hence identify a particular cache line in way 0 520 and a particular cache line in way 1 525. Based on this identified set, the two associated counters (one in counter RAM portion 500 and one in counter RAM portion 505) will be accessed as shown in FIG. 11 and their count values will be forwarded to eviction control circuitry 570. This will then compare the counter values, and chooses as the victim cache line the cache line with the smallest count value.

Since the update mechanism described with reference to FIG. 10 will cause the counter to be incremented more rapidly for accesses associated with high priority threads, then it can be seen that such an eviction mechanism will tend to evict cache lines storing content associated with low priority threads rather than evict cache lines storing content associated with high priority threads. Hence, the prediction made by the prediction circuitry, namely the identification of a cache line to be evicted, will be skewed in favour of evicting low priority cache lines rather than high priority cache lines. Hence, when a victim cache line needs to be chosen in order to make way for new content being stored by a high priority thread, the prediction mechanism is more accurate than it would be when choosing a victim cache line to make way for new content to be stored by a low priority thread, since it will have a tendency to identify low priority cache lines for eviction, which is the desired behaviour if seeking to improve the performance of high priority threads.

From the above discussion of embodiments of the present invention, it will be seen that such embodiments provide a mechanism for skewing prediction accuracy in favour of high priority operations over low priority operations, which enables the history storage of prediction circuitry to be shared between such high priority operations and low priority operations, whilst alleviating the potential adverse effects of such sharing on the high priority operations. In one embodiment, skewed history counters are used with a fractional update mechanism to assign different weights or fractions to different priority processing operations whilst retaining narrow-width counters. In an alternative embodiment, the size of the history counters is increased, and differential integer updates are used for different priority operations to achieve a similar skewing of prediction in favour of high priority operations over low priority operations.

In addition to skewing prediction accuracy in favour of high priority operations, when using the earlier-mentioned fractional update mechanism which is probabilistic in nature, counter entries do not need to be updated every time update data is received, and hence less energy is consumed in updating the counter array than would be the case for a typical prior art counter array.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
   processing circuitry for performing processing operations including high priority operations and low priority operations, events occurring during performance of said processing operations; and
   prediction circuitry, responsive to a received event, for generating prediction data used by the processing circuitry in performing said processing operations, the prediction circuitry comprising:
   a history storage having a plurality of counter entries for storing count values, wherein each of the plurality of counter entries of the history storage are shared for both the high priority operations and the low priority operations;
   index circuitry for identifying, dependent on the received event, at least one counter entry and for causing the history storage to output a count value stored in each of said identified at least one counter entry, the prediction data being derived from the count value output from the history storage;
   update control circuitry, responsive to update data generated by the processing circuitry during performance of said processing operations, for modifying at least one of said count values stored in the history storage, the update control circuitry having a priority dependent modification mechanism such that the modification to the at least one of said count values is dependent on a priority of the processing operation with which that update data is associated, the priority dependent modification mechanism being such that the prediction data output for a received event associated with a high priority operation is more accurate than the prediction data output for a received event associated with a low priority operation, wherein the update control circuitry is responsive to the update data to determine whether the at least one of said count values should be incremented or decremented, and the priority dependent modification mechanism specifies an amount by which the at least one of said count values is to be incremented or decremented, the priority dependent modification mechanism specifying said amount to be larger for update data associated with a high priority operation than for update data associated with a low priority operation.

2. The data processing apparatus as claimed in claim 1, wherein for at least the update data associated with a low priority operation the priority dependent modification mechanism specifies said amount to be a fractional value.

3. The data processing apparatus as claimed in claim 1, wherein each counter entry can only be incremented or decremented by an integer value, the priority dependent modification mechanism being responsive to at least update data associated with a low priority operation to perform a probabilistic operation based on a specified fractional value to determine whether or not to modify the at least one of said count values so as to achieve fractional updates through the use of said probabilistic operation.

4. The data processing apparatus as claimed in claim 3, wherein the priority dependent modification mechanism comprises random number generator circuitry to perform said probabilistic operation.

5. The data processing apparatus as claimed in claim 1, wherein the priority dependent modification mechanism specifies said amount to be a larger integer for update data associated with a high priority operation than for update data associated with a low priority operation, and the prediction circuitry is arranged to derive the prediction data from a selected portion of the at least one output count value, the selected portion varying dependent on the priority of the processing operation associated with the received event.

6. The data processing apparatus as claimed in claim 5, wherein for a received event associated with a high priority operation the selected portion comprises a number of most significant bits of said count value output from the history storage, and for a received event associated with a low priority operation the selected portion comprises a number of least significant bits of said count value output from the history storage, at least one bit of the count value being in the selected portion irrespective of whether the received event is associated with a high priority operation or a low priority operation.

7. The data processing apparatus as claimed in claim 1, wherein said prediction circuitry is branch prediction circuitry, the received event identifies an address of a branch instruction to be executed by the processing circuitry, and the prediction data predicts whether a branch identified by the branch instruction will be taken or not taken.

8. The data processing apparatus as claimed in claim 1, wherein the processing circuitry employs a cache, the prediction circuitry is a cache miss prediction circuitry, the received event identifies an address of a memory access instruction, and the prediction data predicts whether execution of that memory access instruction will result in a cache miss.

9. The data processing apparatus as claimed in claim 1, wherein the prediction circuitry is a value prediction circuitry, the received event identifies a processing operation to be performed by the processing circuitry, and the prediction data provides an indication as to whether a value prediction should be made for that processing operation.

10. The data processing apparatus as claimed in claim 1, further comprising:
a storage structure comprising a plurality of storage elements for storing information for access by the processing circuitry;
the prediction circuitry being provided within eviction circuitry used to perform an eviction operation to select from a plurality of candidate storage dements a victim storage element whose stored information is to be evicted from the storage structure;
the received event being an event identifying that an eviction operation is required;
the update data identifying accesses to each storage element, and the history storage having a counter entry for each storage element;
whereby when the eviction operation is performed, the index circuitry identifies counter entries associated with the plurality of candidate storage elements and the prediction circuitry produces the prediction data dependent on a comparison of the count values in the identified counter entries, the prediction data identifying the victim storage element.

11. The data processing apparatus as claimed in claim 10, wherein the storage structure is a cache and each storage element is a cache line.

12. The data processing apparatus as claimed in claim 11, wherein the cache is an n-way set associative cache, and when performing the eviction operation the plurality of candidate storage elements are a plurality of cache lines within a particular set of the cache.

13. The data processing apparatus as claimed in claim 1, wherein the processing circuitry is a multi-threaded processing circuitry having multiple threads of execution, at least one of said multiple threads being specified as a high priority thread, and processing operations occurring during execution of that high at least one priority thread being high priority operations.

14. The data processing apparatus as claimed in claim 1, wherein certain types of processing operation are specified as high priority operations.

15. A method of operating prediction circuitry to generate, in response to a received event, prediction data for processing circuitry of a data processing apparatus, the processing circuitry performing processing operations including high priority operations and low priority operations, and events occurring during performance of said processing operations, the method comprising the steps of:
maintaining a history storage having a plurality of counter entries for storing count values, wherein each of the plurality of counter entries of the history storage are shared for both the high priority operations and the low priority operations;
identifying, dependent on the received event, at least one counter entry and causing the history storage to output a count value stored in each of said identified at least one counter entry;
deriving the prediction data from the count value output from the history storage;
responsive to update data generated by the processing circuitry during performance of said processing operations, modifying at least one of said count values stored in the history storage, said modifying being performed by a priority dependent modification mechanism such that the modification to the at least one of said count values is dependent on a priority of the processing operation with which that update data is associated;
the priority dependent modification mechanism being such that the prediction data output for a received event associated with a high priority operation is more accurate than the prediction data output for a received event associated with a low priority operation, wherein the modifying step is responsive to the update data to determine whether the at least one of said count values should be incremented or decremented, and the priority dependent modification mechanism specifies an amount by which the at least one of said count values is to be incremented or decremented, the priority dependent modification mechanism specifying said amount to be larger for update data associated with a high priority operation than for update data associated with a low priority operation.

16. A data processing apparatus, comprising:
processing means for performing processing operations including high priority operations and low priority operations, events occurring during performance of said processing operations;

prediction means, responsive to a received event, for generating prediction data used by the processing means in performing said processing operations, the prediction means comprising:
- a history storage means having a plurality of counter entry means for storing count values, wherein each of the plurality of counter entry means of the history storage means are shared for both the high priority operations and the low priority operations;
- index means for identifying, dependent on the received event, at least one counter entry means and for causing the history storage means to output a count value stored in each of said identified at least one counter entry means, the prediction data being derived from the count value output from the history storage means;
- update control means, responsive to update data generated by the processing means during performance of said processing operations, for modifying at least one of said count values stored in the history storage means, the update control means having a priority dependent modification mechanism such that the modification to the at least one of said count values is dependent on a priority of the processing operation with which that update data is associated, the priority dependent modification mechanism being such that the prediction data output for a received event associated with a high priority operation is more accurate than the prediction data output for a received event associated with a low priority operation, wherein the update control means is responsive to the update data to determine whether the at least one of said count values should be incremented or decremented, and the priority dependent modification mechanism specifies an amount by which the at least one of said count values is to be incremented or decremented, the priority dependent modification mechanism specifying said amount to be larger for update data associated with a high priority operation than for update data associated with a low priority operation.

* * * * *